(12) United States Patent
Meier-Haack et al.

(10) Patent No.: US 11,884,764 B2
(45) Date of Patent: Jan. 30, 2024

(54) MEMBRANES FOR LIQUID TREATMENT

(71) Applicant: LEIBNIZ-INSTITUT FUER POLYMERFORSCHUNG DRESDEN E.V., Dresden (DE)

(72) Inventors: Jochen Meier-Haack, Dresden (DE); Wladimir Butwilowski, Radebeul (DE); Tim Oddoy, Freital (DE); Kornelia Schlenstedt, Dresden (DE)

(73) Assignee: LEIBNIZ-INSTITUT FUER POLYMERFORSCHUNG DRESDEN E.V., Dresden (DE)

( * ) Notice: Subject to any disclaimer, the term of this patent is extended or adjusted under 35 U.S.C. 154(b) by 505 days.

(21) Appl. No.: 16/953,589

(22) Filed: Nov. 20, 2020

(65) Prior Publication Data
US 2021/0163655 A1 Jun. 3, 2021

(30) Foreign Application Priority Data
Nov. 22, 2019 (DE) ...................... 10 2019 131 675.8

(51) Int. Cl.
*C08F 293/00* (2006.01)
*C08J 5/22* (2006.01)
*C08J 9/28* (2006.01)

(52) U.S. Cl.
CPC .......... *C08F 293/00* (2013.01); *C08J 5/2256* (2013.01); *C08J 9/28* (2013.01); *C08J 2383/12* (2013.01)

(58) Field of Classification Search
CPC .... C08F 293/00; C08J 5/2256; C08J 2383/12; C08J 9/28; B01D 71/80
See application file for complete search history.

(56) References Cited

U.S. PATENT DOCUMENTS

| | | | |
|---|---|---|---|
| 5,126,495 A | 6/1992 | Serini et al. | |
| 9,139,686 B2 | 9/2015 | Weib et al. | |
| 2013/0004454 A1* | 1/2013 | Weiss | B01D 71/54 210/500.36 |
| 2014/0364567 A1* | 12/2014 | Balsara | B01D 71/42 549/490 |
| 2016/0002411 A1 | 1/2016 | Menozzi et al. | |
| 2017/0282128 A1* | 10/2017 | Berzinis | B01D 67/0095 |

FOREIGN PATENT DOCUMENTS

| | | |
|---|---|---|
| DE | 10 2010 001 482 | 8/2011 |
| EP | 0 416 376 | 3/1991 |
| EP | 2 545 096 | 10/2016 |
| WO | 2014/170391 | 10/2014 |

OTHER PUBLICATIONS

Lang, C. et al. Current status and future directions of self-assembled block copolymer membranes for molecular separations. Soft Matter, 2021, 17, 10405. (Year: 2021).*

Text of WO 2018093714 A1 by Dorin et al. (Year: 2018).*
Kobayashi et al., "Porous Polydimethylsiloxane Membranes Treated with Aminopropyltrimethoxysilane", Journal of Applied Polymer Science, vol. 51, 483-489 (1994), pp. 483-489.
Meier-Haack et al., "Use of Polyelectrolyte Multilayer Systems for Membrane Modification", Macromol. Symp. 188, 91-103 (2002), pp. 91-103.
Rana et al., "Surface Modifications for Antifouling Membranes", Chem. Rev. 2010, 110, pp. 2448-2471.
Noshay et al., "Silylamine-Hydroxyl Reaction in the Synthesis of Organo-Siloxane Block Copolymers", Research and Development Department, Chemicals and Plastics, Union Carbide Corp., Ind. Eng. Chem. Prod. Res. Develop., V2, No. 4, 1973 , pp. 268-277.

(Continued)

*Primary Examiner* — K. Boyle
*Assistant Examiner* — Christina H. W. Rosebach
(74) *Attorney, Agent, or Firm* — GREENBLUM & BERNSTEIN, P.L.C.

(57) ABSTRACT

The invention concerns the field of polymer chemistry and relates to membranes, such as those that can be used, for example, for the preparation of aqueous solutions using microfiltration or ultrafiltration.

The object of the present invention is to specify membranes which have improved anti-fouling properties and sliding friction properties.

The object is attained with membranes comprised at least predominantly of multiblock copolymers of the general formula (1)

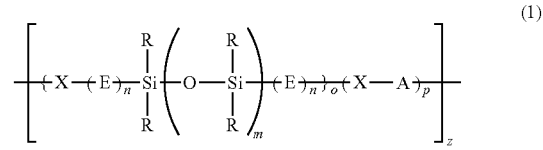

(1)

where
X=connection point
E=$C_2$ to $C_4$ alkyl ether
A=other block component not containing silicone
R=$C_1$ to $C_4$ alkyl radical and/or phenyl radical
m=1<m<500
n=0≤n<100
o=1<o<10
p=1<p<10
z=1<z<25,
the molar ratio of the silicone-containing block component and the other block component A in the multiblock copolymer is between 5:1 and 1:5,
and wherein the silicon-containing block components are predominantly arranged at the surface of the membranes.

12 Claims, No Drawings

(56) References Cited

OTHER PUBLICATIONS

Yong et al., "Polyamide thin film composite membrane prepared from m-phenylenediamine and m-phenylenediamine-5-sulfonic acid", Journal of Membrane Science 270 (2006), pp. 162-168.
Geise et al., "Water Purification by Membranes: The Role of Polymer Science", Journal of Polymer Science: Part B: Polymer Physics, vol. 48, (2010) DOI: 10.1002/polb.22037, pp. 1685-1718.
Heijnen et al., "Ultrafiltration membranes from novel low-fouling copolymers for RO pretreatment applications (Part II)", Presented at the EDS conference on Desalination for the Environment: Clean Water and Energy, Rome, Italy, May 22-26, 2016, pp. 29-34.
Mulder,"Basic Principles of Membrane Technology", Kluwer Academic Publishers, 20 Dordrecht, Netherlands (1990), p. 58 et seq.

* cited by examiner

MEMBRANES FOR LIQUID TREATMENT

CROSS-REFERENCE TO RELATED APPLICATION

This application claims priority under 35 U.S.C. § 119(a) of German Patent Application No. 10 2019 131 657.8 filed Nov. 22, 2019, the disclosure of which is expressly incorporated by reference herein in its entirety.

The invention concerns the field of polymer chemistry and relates to membranes for liquid treatment, such as those which can for example be used in the food industry, water treatment, medical engineering, or biotechnology as membranes for the preparation of aqueous solutions using microfiltration or ultrafiltration, for example as low-fouling membranes.

Despite research activities across the globe, fouling continues to be a significant problem in membrane filtration. In addition to the pre-purification of the feed, the design, operating conditions and cleaning of the membranes, the properties of the membrane surface itself constitute an essential aspect for the fouling tendency of membranes (G. M. Geise: J. Polym. Sci. Part B, Polym. Phys. 48 (2010) 1685).

Numerous approaches to reducing membrane fouling by modifying the membrane surface are known. In most cases, the hydrophilization of the membrane surface is sought.

D. Rana and T. Matsuura: Chem. Rev. 110 (2010) 2448 provide an overview of various surface modification methods that are intended to achieve reduced fouling in membranes.

From J. Meier-Haack and M. Müller: Macromol. Symp. 188 (2002) 91, the modification of membrane surfaces with polyelectrolytes and polyelectrolyte complexes is known.

According to Z. Yong et al.: J. Membr. Sci. 270 (2006) 162, TFC PA reverse osmosis membranes are known which contain sulfonated monomer units in the polyamide layer.

Another approach to solving the problems was the use of block copolymers containing siloxane. However, due to the structure and properties thereof, these siloxane-containing block copolymers, which have been known as materials per se since the early 1970s, have thus far been used as an additive and for dense membranes for gas separation.

In WO 2011/110441 A2, block copolymers of linear oligo- or polysiloxanes and organic polymers are described. OH-terminated polysiloxanes and OH-terminated organic blocks are chemically coupled with one another by means of a diisocyanate.

Membranes of polyethersulfone with 5 wt % silicone additive in the casting solution exhibit a) an accumulation of the silicone at the surface and b) anti-adhesive properties tested for proteins (BSA) and bacteria.

The production of siloxane-PSU block copolymers has been described by Noshay et al. (A. Noshay et al., Ind. Eng. Chem. Prod. Res. Develop. 12 (1973) 268) by performing the silyl amine-hydroxyl reaction. The obtained materials have an increased elasticity compared to pure PSU. The mechanical properties can be adjusted through the molecular weights of the PSU blocks or PDMS blocks.

According to US 2016/0002411 A1, it is also known that siloxane-containing block copolymers have been used as additives in the production of polymer membranes. The production of the additives is the same as in WO 2011/110411 A2. Improved chemical stabilities over cleaning chemicals, such as sodium hypochlorite, were achieved. Filtration tests using river water resulted in a 4-20% higher yield, depending on the method of operation. After 800 h of operation, no significant changes in retention were observed (see also M. Heijnen et al., Desal. Water Treatm. 69 (2017) 29).

According to EP 0416376 A2, polyester carbonate-polysiloxane block copolymers with a 5 wt % siloxane content are known. These were obtained from a one-pot/two-step synthesis. Injection-molded test samples of these materials have a markedly improved gasoline resistance over comparison samples with no siloxane content.

According to DE 10 2010 001 482 A1, porous silicone molded bodies are known. These are obtained by dissolving organopolysiloxane-polyurea copolymers in a solvent mixture and evaporating the solvents, wherein the boiling points of the solvents should at least have a difference of 30° C. Depending on the procedure, porous molded bodies with a solid or porous surface are obtained, wherein the pore size is 10 μm.

Solutions from the prior art for producing porous membranes of polydimethylsiloxane (PDMS) have the disadvantage that they cannot be produced with the aid of the phase inversion method, as can membranes of polyethersulfone (PES) or polyvinylidene difluoride (PVDF), since PDMS is normally present as viscous liquid or wax, depending on the molecular weight.

For the production of porous membranes of PDMS, for example according to Kobayashi et al.: J. of Appl. Polymer Science 51 (1994) 483-489, crosslinkable siloxane components are dispersed in 1,4-dioxane as pore-forming material, and the pore-forming material is washed out following the crosslinking procedure. Once the pore-forming material is washed out, porous PDMS membranes are obtained which, however, have pore sizes in the range of 1 to 5 μm if 45 wt % 1,4-dioxane was used. At dioxane contents <25 wt %, dense membranes were obtained.

The basic production of porous membranes of polyethersulfone according to the phase inversion method (in this case, the dissolution-precipitation method) is state-of-the-art technology (Marcel Mulder in "Basic Principles of Membrane Technology", Kluwer Academic Publishers, Dordrecht, Netherlands (1990), page 58 et seq.).

In the phase inversion method, the polymer that is to be formed into a membrane is dissolved in a solvent. This solution is spread on a substrate at a certain thickness and then immersed in a precipitation bath. The solvent is fully miscible with the liquid of the precipitation bath, but the polymer is insoluble in the precipitation bath liquid. As a result of the exchange of solvent and precipitation bath liquid, the solubility limit of the polymer is reached and a separation occurs. A polymer-rich phase and a polymer-lean phase form. The further exchange of solvent and precipitation bath liquid results in the solidification of the polymer-rich phase. After a complete exchange of solvent and precipitation bath liquid, the precipitation process is concluded and the polymer-rich solid phase forms the membrane. The polymer-free liquid phase comprised of precipitation bath liquid fills the pore volume of the membrane.

A disadvantage with the solutions from the prior art is that the anti-fouling and sliding friction properties thereof, as well as the compatibility with tissue and bodily fluids, are not yet fully satisfactory, in particular in medical applications.

The object of the present invention is to specify membranes for liquid treatment which have improved anti-fouling properties and at the same time also improved sliding friction properties as well as compatibility with tissue and bodily fluids.

The object is attained by the invention specified in the claims. Advantageous embodiments are the subject matter of the dependent claims, wherein the invention also includes combinations of the individual claims within the meaning of a logical AND operation, provided that they are not mutually exclusive.

The membranes for liquid treatment according to the invention are comprised at least predominantly of multiblock copolymers of the general formula (1)

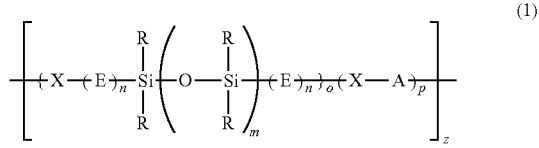

where
X=connection point
E=$C_2$ to $C_4$ alkyl ether
A=other block component not containing silicone
R=$C_1$ to $C_4$ alkyl radical and/or phenyl radical
m=1<m<500
n=0≤n<100
o=1<o<10
p=1<p<10
z=1<z<25, the molar ratio of the silicone-containing block component and the other block component A in the multiblock copolymer is between 5:1 and 1:5, and wherein the silicon-containing block components are predominantly arranged at the surface of the membranes.

The membranes are advantageously comprised of the multiblock copolymers according to the formula (1) at 60 to 100 wt %, more advantageously 80 to 100 wt %.

Likewise advantageously, the multiblock copolymers according to the formula (1) comprise at least one silicon-containing block component and at least one other, non-silicon-containing block component A, wherein more advantageously polydimethylsiloxane, polydiphenylsiloxane, polymethylphenylsiloxane, poly(alkyl ether)-polysiloxane copolymers, or mixtures of these polymers are present as silicone-containing block component; and/or the silicone-containing block components comprise at least two reactive end groups, advantageously such as OH, $NH_2$, thiol, isocyanate, carboxylic anhydride, vinyl, allyl, alkyne, azide, halogen, or glycidyl; and/or polysulfone, polyethersulfone, polyetherethersulfone, polyetherketone, polyetheretherketone, polyester, polycarbonate, polyamide, polyvinylidene fluoride, polyacrylonitrile, or cellulose acetate or a mixture of these polymers are present as other, non-silicone-containing block components A; and/or the other, non-silicone-containing block components A comprise at least two reactive end groups, such as OH, $NH_2$, thiol, isocyanate, carboxylic anhydride, vinyl, allyl, alkyne, azide, or glycidyl.

Further advantageously, the molecular weights of the silicon-containing block components are 1000 g/mol to 50000 g/mol, and the molecular weights of the other, non-silicon-containing block component A are 5000 g/mol to 25000 g/mol.

And also advantageously, aliphatic or aromatic urea groups or urethane groups or amide groups or ester groups or ether groups or thioether groups or amic acid groups or ester acid groups or hydroxy ether groups or imide groups or triazole groups are present as connection point X in the multiblock copolymer according to the formula (1).

It is also advantageous if, in the multiblock copolymers according to the formula (1),
m is between 10 and 200, advantageously between 50 and 150,
n is between 0 and 80, advantageously between 0 and 50,
o is between 1 and 6, advantageously between 1 and 5,
p is between 1 and 8, advantageously between 1 and 5,
z is between 5 and 20, advantageously between 8 and 15,
the molar ratio of the silicone-containing block component and the other block component A in the multiblock copolymer is between 3:1 and 1:3.

It is further advantageous if the membranes are present in the form of flat membranes, hollow-fiber membranes, or capillary membranes.

It is likewise advantageous if the membranes have a pore size of 1 nm to 1 μm, advantageously between 5 nm and 0.1 μm.

In the method according to the invention for producing membranes for liquid treatment, the membranes are produced by means of the phase inversion method, wherein a solution of 5-30 wt % multiblock copolymer according to formula (1) and 0-10 wt % of a non-silicone-containing polymer and 0-20 wt % of other solution additives and 50-95 wt % of a solvent that is miscible with water and a precipitation bath of 80-100 wt % water and 0-20 wt % other precipitation additives are used.

Advantageously, N,N-dimethylacetamide, N,N-dimethylformamide, N-methyl-2-pyrrolidone, N-ethyl-2-pyrrolidone, dimethyl sulfoxide, acetone, 1,4-dioxane, or tetrahydrofuran, or mixtures of these solvents are used as solvents that are miscible with water.

It is further advantageous if polysulfone, polyethersulfone, polyetherethersulfone, polyetherketone, polyetheretherketone, polyester, polycarbonate, polyamide, polyvinylidene fluoride, polyacrylonitrile, or cellulose acetate or a mixture of these polymers is used as non-silicone-containing polymer. It is more advantageous if the non-silicone-containing polymer has the same chemical structure as the non-silicone-containing block component A according to the formula (1).

Likewise advantageously, water, ethylene glycol, diethylene glycol, triethylene glycol, tetraethylene glycol, polyethylene glycol, and/or polyvinylpyrrolidone are used as other solution additives.

Further advantageously, methanol, ethanol, propyl alcohol, isopropyl alcohol, ethylene glycol, and/or solvents that are miscible with water are used as other precipitation additives.

It is also advantageous if the solvents that are miscible with water for the solution are also used as precipitation additive for the precipitation bath.

It is likewise advantageous if a precipitation bath temperature of 0° C. to 50° C., advantageously of 15° C. to 30° C., is used.

According to the invention, the membranes according to the invention are used in the food industry, water treatment, biotechnology, or medical engineering.

With the present invention, it becomes possible to specify for the first time membranes for liquid treatment which have improved anti-fouling properties and at the same time also improved sliding friction properties as well as compatibility with tissue and bodily fluids.

This is achieved with membranes for liquid treatment that are comprised, at least predominantly, advantageously at 60 to 100 wt %, more advantageously at 80 to 100 wt %, of multiblock copolymers of the general formula

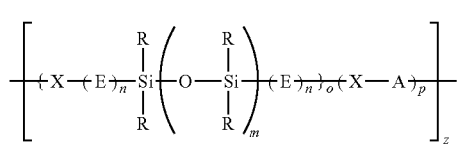

where
X=connection point
E=$C_2$ to $C_4$ alkyl ether
A=other block component not containing silicone
R=$C_1$ to $C_4$ alkyl radical and/or phenyl radical
m=1<m<500
n=0≤n<100
o=1<o<10
p=1<p<10
z=1<z<25,
the molar ratio of the silicone-containing block component and the other, non-silicone-containing block component A in the multiblock copolymer is between 5:1 and 1:5.

In the membranes according to the invention, the multiblock copolymers according to the formula (1) comprise at least one silicone-containing block component and at least one other, non-silicone-containing block component A.

Advantageously, polydimethylsiloxane, polydiphenylsiloxane, polymethylphenylsiloxane, poly(alkyl ether)-polysiloxane copolymers, or mixtures of these polymers are present as silicone-containing block component and, likewise advantageously, comprise at least two reactive end groups, advantageously such as OH, $NH_2$, thiol, isocyanate, carboxylic anhydride, vinyl, allyl, alkyne, azide, or glycidyl.

Advantageously, polysulfone, polyethersulfone, polyetherethersulfone, polyetherketone, polyetheretherketone, polyester, polycarbonate, polyamide, polyvinylidene fluoride, polyacrylonitrile, or cellulose acetate or a mixture of these polymers, are present as other, non-silicone-containing block component A and, likewise advantageously, comprise at least two reactive end groups, advantageously such as OH, $NH_2$, thiol, isocyanate, carboxylic anhydride, vinyl, allyl, alkyne, azide, halogen, or glycidyl.

The molecular weights of the silicon-containing block component are advantageously in the range from 1000 g/mol to 50000 g/mol, and the molecular weights of the other, non-silicon-containing block component A are advantageously in the range of 5000 g/mol to 25000 g/mol.

Furthermore, aliphatic or aromatic urea groups or urethane groups or amide groups or ester groups or ether groups or thioether groups or amic acid groups or ester acid groups or hydroxy ether groups or imide groups or triazole groups are advantageously present as connection point X in the silicone-containing multiblock copolymer according to the formula (1).

It is likewise advantageous if, in the silicone-containing multiblock copolymers according to the formula (1), m is between 10 and 400, advantageously between 50 and 300,
n is between 0 and 80, advantageously between 0 and 50,
o is between 1 and 6, advantageously between 1 and 5,
p is between 1 and 8, advantageously between 1 and 5,
z is between 3 and 20, advantageously between 8 and 15,
the molar ratio of the silicone-containing block component and the other, non-silicone-containing block component A in the multiblock copolymer is between 3:1 and 1:3.

Furthermore, according to the invention, the silicon-containing block components in the membranes according to the invention are predominantly arranged at the surface of the membranes. According to the invention, the silicone-containing block components accumulate at the membrane surfaces, provided that the membranes are not completely comprised of the multiblock copolymers according to the invention with silicon-containing block components according to the formula (1).

The membranes according to the invention can be present in the form of flat membranes, hollow-fiber membranes, or capillary membranes.

In the multiblock copolymer according to formula (1), the silicone-containing block component is chemically bonded to the other, non-silicone-containing block component A. The coupling of the block components occurs either directly via the reactive end groups of the silicone-containing block components and the other, non-silicone-containing block components A, e.g. via OH groups and acid anhydride groups, or a coupler, e.g. diacid chloride, is present which can react both with the reactive end groups of the silicone-containing block components and also with the reactive end groups of the other, non-silicone-containing block components A.

Because the silicone-containing block component is chemically bonded with the other, non-silicone-containing block component A, the silicone-containing block component of the multiblock copolymers cannot be washed out during the membrane formation process and during the use of the membrane.

In the method according to the invention for producing membranes for liquid treatment, the membranes are produced by means of the phase inversion method.

The casting solution required for this method is thereby comprised of 5-30 wt % multiblock copolymer according to the formula (1) and 0-10 wt % of a non-silicone-containing polymer and 0-20 wt % of other solution additives and 50-95 wt % of a solvent that is miscible with water. Additionally, a precipitation bath of 80-100 wt % water and 0-20 wt % other precipitation additives is used.

N,N-dimethylacetamide (DMAc), N,N-dimethylformamide (DMF), N-methyl-2-pyrrolidone (NMP), N-ethyl-2-pyrrolidone (NEP), dimethyl sulfoxide (DMSO), acetone, 1,4-dioxane, or tetrahydrofuran (THF) or mixtures of these solvents can for example be used as solvents that are miscible with water.

Polysulfone, polyethersulfone, polyetherethersulfone, polyetherketone, polyetheretherketone, polyester, polycarbonate, polyamide, polyvinylidene fluoride, polyacrylonitrile, or cellulose acetate or a mixture of these polymers can be used as non-silicone-containing polymers, wherein it is advantageous if the non-silicone-containing polymer has the same chemical structure as the non-silicone-containing block component A according to the formula (1).

Other solution additives, such as water, ethylene glycol, diethylene glycol, triethylene glycol, tetraethylene glycol, polyethylene glycol, and/or polyvinylpyrrolidone can advantageously be used.

Methanol, ethanol, propyl alcohol, isopropyl alcohol, ethylene glycol, and/or solvents that are miscible with water can be used as other precipitation additives.

One particularly advantageous approach is if the solvents that are miscible with water for the solution are also used as precipitation additive for the precipitation bath.

Further advantageously, a temperature of 0° C. to 50° C., advantageously of 15° C. to 30° C., is used in the precipitation bath.

The production of the membranes according to the invention, comprised at least predominantly of silicone-containing multiblock copolymers according to the formula (1), takes place according to the phase inversion method. For this purpose, a casting solution is produced which is comprised of 5-30 wt % of the silicone-containing multiblock copolymer according to the formula (1), 50-95 wt % of a solvent that is miscible with water or a mixture of solvents that are miscible with water, and 0-10 wt % of a non-silicone-containing polymer and 0-20 wt % of other solution additives. This solution is applied to a substrate by means of a doctor blade technique with a gap height of 50 to 300 μm, preferably 70 to 200 μm. If the substrate is a non-woven fabric, it can be impregnated with the solvent or solvent mixture that is miscible with water prior to the application of the casting solution. After a waiting time of 0 to 600 s, advantageously 15 to 120 s, the protomembrane is immersed in a precipitation bath that is comprised of 80-100% water and 0-20% precipitation additives, such as methanol, ethanol, propyl alcohol, isopropyl alcohol, ethylene glycol, and/or solvents that are miscible with water, for example. The membranes are washed with water and, in a final step, preserved with glycerin or stored in DI water, to which 0.1% $NaN_3$ has been added, at 4° C. until further use.

For the membranes according to the invention, it is of importance not only that the multiblock copolymers according to the general formula (1) are added to the membrane materials as additive, but that it is contained in the finished membrane at least in a predominant amount, advantageously at 60 to 100 wt %, more advantageously at 80 to 100 wt %. It has also proven advantageous to produce and specify a membrane according to the invention completely from the multiblock copolymer according to the general formula (1).

Furthermore, the porous membranes of polydimethylsiloxane (PDMS) according to the prior art differ from the membranes according to the invention in particular in that the PDMS membranes according to the prior art are unsuitable for the treatment of liquid because of the wide pore-size distribution. In addition, there is the risk of a dense film forming on the upper surface of the PDMS membrane in the case of an insufficient amount of pore-forming material, whereby the use for the treatment of liquid is even less feasible. Furthermore, these PDMS membranes according to the prior art must be relatively thick (several 100 μm) in order to achieve an adequate mechanical stability.

The membranes according to the invention are characterized by low biofouling and high compatibility with living tissue and bodily fluids and improved sliding friction properties. Suitable sliding friction properties of this type are above all advantageous during use, e.g. in catheters that can as a result be applied or removed more easily since the tissue can adhere less well to the surface.

Another advantage of the membrane according to the invention is the high amount of silicone component in the membrane, which additionally gives the membrane elastic properties and a low surface energy, whereby the adhesion of tissue or bacteria or proteins is likewise hampered or prevented, which results in the need to carry out fewer cleaning cycles for the membrane, whereby the service life of the membranes is also increased.

By reducing the number of cleaning cycles, the process costs can also be decreased.

And finally, it is an advantage of the membranes according to the invention that they exhibit high compatibility with living tissue and bodily fluids.

As a result of the advantageous properties of the membranes according to the invention, the service life thereof can also be increased.

In addition, because of the improved properties of the membranes according to the invention, new fields of application can arise, such as in medical engineering or biotechnology, for example.

The invention is explained below in greater detail with the aid of several exemplary embodiments.

COMPARATIVE EXAMPLE 1

Production of a membrane from pure polysulfone (PSU; Solvay Udel P3500 LCD)

A non-woven fabric (novatexx 2484; Freudenberg Filtration Technologies SE & Co. KG) is fixed on a glass plate using double-sided adhesive tape. The non-woven fabric is impregnated with a 4:1 mixture of NMP/water. Excess impregnating solution is removed with a doctor blade after 10 min of waiting time. The casting solution, comprised of 20% PSU in 80% NMP, is applied to the non-woven fabric using a doctor blade (gap height of 100 μm) at a drawing speed of 4.7 mm/sec. The protomembrane is immersed in a precipitation bath (water) at 23° C. 15 sec after the drawing process and is left in the precipitation bath for 10 min. The membrane is then detached from the glass plate and washed with DI water at room temperature while the water is changed multiple times. Until further use, the membrane is stored in DI water, to which 0.1% $NaN_3$ has been added, in a refrigerator.

The membrane produced in this manner has characteristic values which are indicated in Table 1.

EXAMPLE 2 a) Production of the other, non-silicone-containing block component A as OH-terminated polysulfone

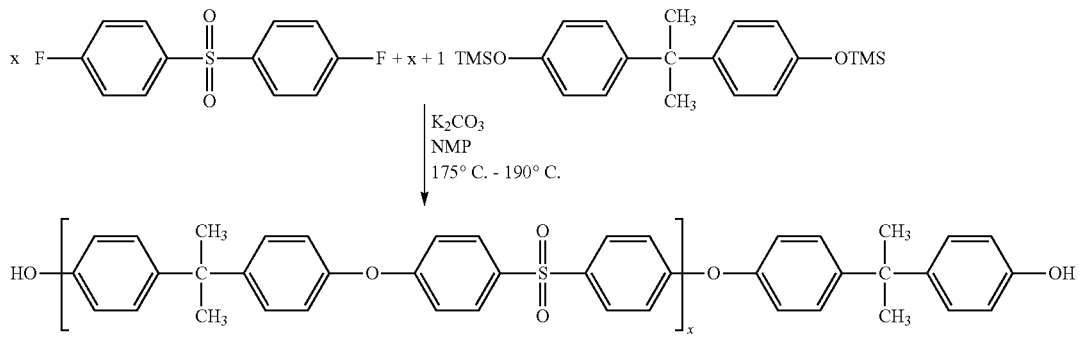

50 mmol (12.713 g) 4,4'-difluorodiphenyl sulfone and 51 mmol (19.006 g) 4,4'-bis(trimethylsiloxy)bisphenol A are dissolved in 50 mL N-methylpyrrolidone (NMP), and 75 mmol (10.37 g) potassium carbonate are added thereto. The batch is stirred at 175° C. for 8 h under a slight argon flow. The temperature is then increased to 190° C. for 2 h, and an additional 100 mg 4,4'-bis(trimethylsiloxy)bisphenol A is added. After cooling down, the product of the reaction is precipitated in 1000 mL ethanol with the addition of 5 mL of concentrated hydrochloric acid. The product is suctioned off and washed with 250 mL ethanol at 50° C. for 5 h, suctioned off, and dried under vacuum at 100° C. Molecular weights of $M_n$=9000 g/mol and $M_w$ 24500 g/mol were measured using GPC (CHCl$_3$; PS standard). The $M_n$ measured using $^1$H-NMR is 18350 g/mol (x=41).

b) Synthesis of the multiblock copolymer according to the formula (1) from a silicone-containing block component (PDMS) and another, non-silicone-containing block component A (polysulfone).

The values for the multiblock copolymer are:
NMR: PDMS incorporation rate 128%
GPC: $M_w$ 49000 g/mol (CHCl$_3$; PS standard)

c) Production of a membrane from the multiblock copolymer according to b)

Producing the Casting Solution:

29 g of the polymer produced in (2) is dissolved in a mixture of 70 g dimethylacetamide (DMAc) and 1 g water while being stirred. The solution is degassed at 90° C. for one hour in a convection drying chamber.

Producing the Membrane:

A non-woven fabric (novatexx 2484; Freudenberg Filtration Technologies SE & Co. KG) is fixed on a glass plate using double-sided adhesive tape. The casting solution is applied to the non-woven fabric using a doctor blade (gap height of 100 µm) at a drawing speed of 4.7 mm/sec. The protomembrane is immersed in a precipitation bath (water) at 23° C. 30 sec after the drawing process and is left in the

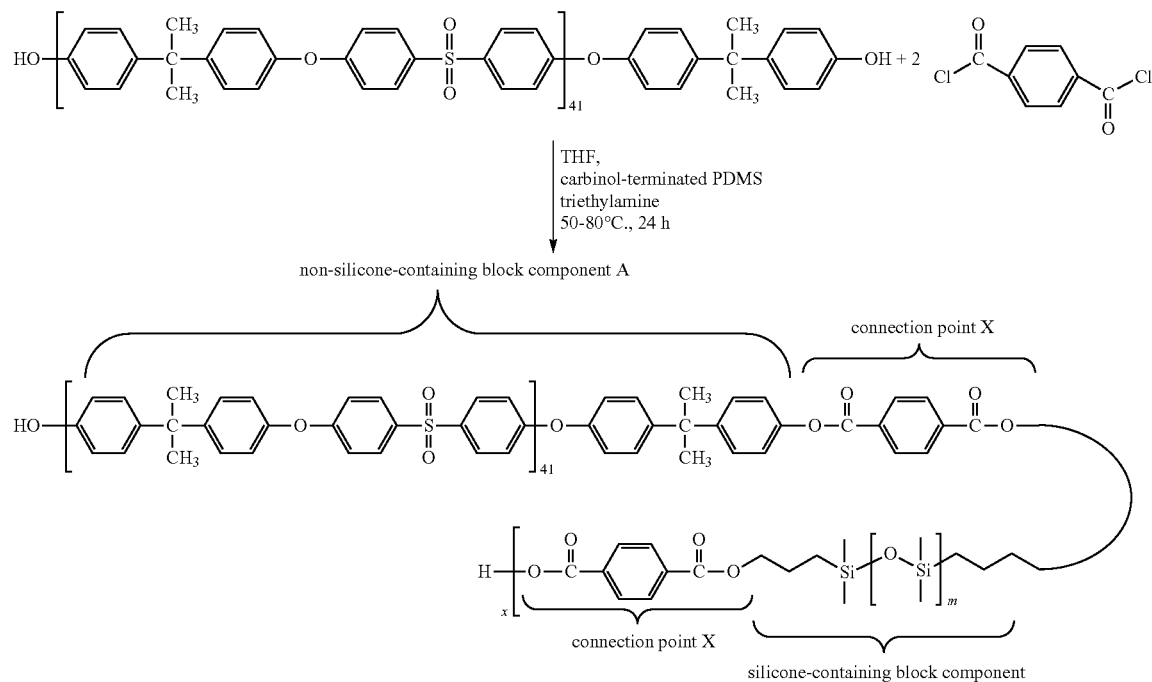

4.04 mmol (0.82 g) terephthaloyl dichloride (connection point X) and 8 mmol dry triethylamine are dissolved in 10 mL dry tetrachloroethane. To this solution are added dropwise (over approx. 1 h) 2 mmol (36.7 g) of the polysulfone (polymer A) from (1) and 2 mmol (2.4 g) of a silicon-containing block component (carbinol-terminated polydimethylsiloxane, Fluorochem LTD, DMS-C15) with a molar mass of 1200 g/mol (m=12), dissolved in 50 mL dry THF. The reaction solution is stirred at room temperature for 3 h and at 90° C. for 1 h, wherein a highly viscous solution is produced. The THF is then distilled off, and stirring continues at 90° C. for another 8 h. After cooling down, the reaction mixture is diluted with 10 mL tetrachloroethane and stirred (homogenized) for another 8 h. In a final step, the reaction product is precipitated in 1000 mL ethanol, washed multiple times with ethanol, and dried under vacuum at 100° C.

precipitation bath for 10 min. The membrane is then detached from the glass plate and washed with DI water at room temperature while the water is changed multiple times. Until further use, the membrane is stored in DI water, to which 0.1% NaN$_3$ has been added, in a refrigerator.

EXAMPLE 3

A silicone-containing multiblock copolymer according to b) is produced according to Example 2 with the use of a silicone-containing block component (aminopropyl-terminated polydimethylsiloxane; Merck KG aA, Catalog No. 481688) with a molecular weight of $M_n$=2500 g/mol (m=31) and polysulfone as other, non-silicone-containing block component A with a molecular weight of $M_n$=10700 g/mol. A membrane is also produced therefrom, likewise according to Example 2.

The values for the multiblock copolymer are:
NMR: PDMS incorporation rate 89%
GPC: $M_w$ 51600 g/mol (CHCl$_3$; PS standard)

EXAMPLE 4

A silicone-containing multiblock copolymer is produced according to Example 2 with the use of a silicone-containing block component (succinic acid anhydride-terminated polydimethylsiloxane; ABCR, Germany, Catalog No. AB130292) with a molecular weight of $M_n$=1200 g/mol and polyethersulfone as other, non-silicone-containing block component A with a molecular weight of $M_n$=10700 g/mol. A membrane is also produced therefrom, likewise according to Example 2.

The values for the multiblock copolymer are:
NMR: PDMS incorporation rate 100%
GPC: $M_w$ 49000 g/mol (CHCl$_3$; PS standard)

The membrane exhibits a significantly improved blood compatibility compared to a membrane of pure polysulfone according to Comparative Example 1.

EXAMPLE 5

A silicone-containing multiblock copolymer according to b) is produced according to Example 2 with the use of a silicone-containing block component (aminopropyl-terminated polydimethylsiloxane; ABCR, Germany, Catalog No. AB153374) with a molecular weight of $M_n$=25000 g/mol (m=331) and polysulfone as other, non-silicone-containing block component A with a molecular weight of $M_n$=17000 g/mol. A membrane is also produced therefrom, likewise according to Example 2, wherein the casting solution contains 18 mass % of the silicone-containing multiblock copolymer and 2 mass% of pure polysulfone (Solvay Udel P3500 LCD).

The values for the multiblock copolymer are:
NMR: PDMS incorporation rate 75%
GPC: $M_w$ 59500 g/mol (CHCl$_3$; PS standard)

The membrane exhibits a significantly improved blood compatibility and improved sliding friction properties compared to a membrane of pure polysulfone according to Comparative Example 1.

Conducting Filtration Tests on the Membranes from Examples 1 through 5

Membranes each having a size of 23×6 cm$^2$ from each one of Example 1 through 5 are installed in a cross-flow filtration cell (Simatec, Germany). The active area is 85 cm$^2$. The permeabilities J are determined using a Simatec LSPa05SPS with the use of a buffer solution (pH 6.8) ($J_v$ before BSA) at a volume flow rate of 30 L/h and a constant permeate volume flow rate of 0.24 L/h, wherein the transmembrane pressure is automatically readjusted. The fouling tests are conducted using a bovine serum albumin (BSA) solution (c=1 g/L in buffer solution; pH 6.8). After the BSA filtration, the membrane is rinsed with buffer solution for 1 h (volume flow rate of 60 L/h, pressureless), and the water permeability is then determined using the buffer solution (value: $J_n$ in Table 2).

The membranes produced in this manner have characteristic values which are indicated in Table 1.

In Tables 1 and 2, various characteristic values of the membranes from the Comparative Example and Examples 2 through 5 are indicated, as well as the chemical composition thereof, which were determined via NMR measurements, and the chemical composition thereof for the surface of the membranes, which were determined by means of EDX measurements.

TABLE 1

Properties of the membranes

| Sample | Contact angle (°) | $J_v$ (L/m$^2$hbar) | $J_n$ (L/m$^2$hbar) |
|---|---|---|---|
| Comparative Example 1 | 73 | 72 | 62 |
| Example 2 | 92 | 9 | 7 |
| Example 3 | 89 | 7 | 2 |
| Example 4 | 90 | 10 | 8 |
| Example 5 | 95 | 52 | 51 |

TABLE 2

Comparison of silicone content in the membrane polymer and at the membrane surface

| Sample | S:Si (bulk) (NMR) | S:Si (surface) (EDX) | Enrichment factor |
|---|---|---|---|
| Comparative Example 1 | 0 | 0 | — |
| Example 2 | 1:0.23 | 1:0.9 | 3.9 |
| Example 3 | 1:0.49 | 1:0.9 | 1.8 |
| Example 4 | 1:1.11 | 1:3.2 | 2.9 |
| Example 5 | 1:2.35 | 1:5.4 | 2.3 |

The invention claimed is:

1. Membranes for liquid treatment, comprised at least predominantly of multiblock copolymers of the general formula (1)

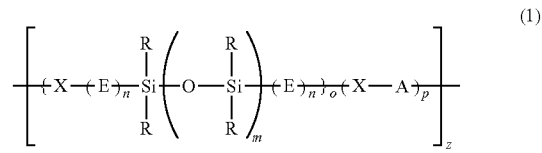

where
X=connection point
E=C$_2$ to C$_4$ alkyl ether
A=other block component not containing silicone
R=C$_1$ to C$_4$ alkyl radical and/or phenyl radical
m=1<m<500
n=0≤n<100
o=1<o<10
p=1<p<10
z=1<z<25,
the molar ratio of the silicone-containing block component and the other block component A in the multiblock copolymer is between 5:1 and 1:5, wherein the silicon-containing block components are predominately arranged at the surface of the membranes, and the membranes have a pore size of 1 nm to 1 µm.

2. The membranes according to claim 1 in which the membranes are comprised 60 to 100 wt %, of the multiblock copolymers according to the formula (1).

3. The membranes according to claim 1 in which the multiblock copolymers according to the formula (1) comprise at least one silicone-containing block component for each at least one other, non-silicone-containing block component A.

4. The membranes according to claim 3 in which polydimethylsiloxane, polydiphenylsiloxane, polymethylphenylsiloxane, poly(alkyl ether)-polysiloxane copolymers or mixtures of these polymers are present as silicone-containing block component.

5. The membranes according to claim 3 wherein a silicone-containing block component with at least two reactive end groups selected from the group consisting of OH, $NH_2$, thiol, isocyanate, carboxylic anhydride, vinyl, allyl, alkyne, azide, halogen, and glycidyl is a reactant in the preparation of the membranes.

6. The membranes according to claim 3 in which polysulfone, polyethersulfone, polyetherethersulfone, polyetherketone, polyetheretherketone, polyester, polycarbonate, polyamide, polyvinylidene fluoride, polyacrylonitrile, or cellulose acetate or a mixture of these polymers are present as other, non-silicone-containing block component A.

7. The membranes according to claim 3 wherein a further, non-silicone-containing Block component A with at least two reactive end groups selected from the group consisting of OH, $NH_2$, thiol, isocyanate, carboxylic anhydride, vinyl, allyl, alkyne, azide, and glycidyl is a reactant in the preparation of the membranes.

8. The membranes according to claim 1 in which the molecular weights of the silicon-containing block components are 1000 g/mol to 50000 g/mol, and the molecular weights of the other, non-silicon-containing block component A are 5000 g/mol to 25000 g/mol.

9. The membranes according to claim 1 in which aliphatic or aromatic urea groups or urethane groups or amide groups or ester groups or ether groups or thioether groups or amic acid groups or ester acid groups or hydroxy ether groups or imide groups or triazole groups are present as connection point X in the multiblock copolymer according to the formula (1).

10. The membranes according to claim 1 in which, in the multiblock copolymers according to the formula (1),
    m is between 10 and 200,
    n is between 0 and 80,
    o is between 1 and 6,
    p is between 1 and 8,
    z is between 5 and 20, and 15,
    the molar ratio of the silicone-containing block component and the other block component A in the multiblock copolymer is between 3:1 and 1:3.

11. The membranes according to claim 1 in which the membranes are present in the form of flat membranes, hollow-fiber membranes, or capillary membranes.

12. The membranes according to claim 1, wherein the pore size is between 5 nm and 0.1 μm.

* * * * *